(12) United States Patent
Fang et al.

(10) Patent No.: US 10,560,295 B2
(45) Date of Patent: Feb. 11, 2020

(54) SLOTTED OFDMA BASED RANDOM ACCESS

(71) Applicant: ZTE Corporation, Shenzhen, Guangdong (CN)

(72) Inventors: Yonggang Fang, San Diego, CA (US); Kaiying Lv, Guangdong (CN); Bo Sun, Guangdong (CN); ZhiQiang Han, Guangdong (CN); Weimin Xing, Guangdong (CN)

(73) Assignee: ZTE Corporation, Shenzhen (CN)

( * ) Notice: Subject to any disclaimer, the term of this patent is extended or adjusted under 35 U.S.C. 154(b) by 139 days.

(21) Appl. No.: 15/739,676

(22) PCT Filed: Jun. 25, 2016

(86) PCT No.: PCT/US2016/039449
§ 371 (c)(1),
(2) Date: Dec. 22, 2017

(87) PCT Pub. No.: WO2016/210389
PCT Pub. Date: Dec. 29, 2016

(65) Prior Publication Data
US 2018/0191541 A1 Jul. 5, 2018

Related U.S. Application Data

(60) Provisional application No. 62/354,071, filed on Jun. 23, 2016.

(30) Foreign Application Priority Data

Jun. 25, 2015 (WO) ................ PCT/CN2015/082389
Nov. 4, 2015 (WO) ................ PCT/CN2015/093777

(51) Int. Cl.
H04L 1/18 (2006.01)
H04L 27/26 (2006.01)
(Continued)

(52) U.S. Cl.
CPC ............ H04L 27/26 (2013.01); H04L 1/1864 (2013.01); H04L 1/1896 (2013.01);
(Continued)

(58) Field of Classification Search
CPC ......... H04L 27/26; H04L 5/0055; H04L 1/18; H04L 5/0007; H04L 1/1864;
(Continued)

(56) References Cited

U.S. PATENT DOCUMENTS 7,068,632 B1  6/2006 Ho et al.
7,499,425 B2  3/2009 Yew et al.
(Continued)

FOREIGN PATENT DOCUMENTS

CN  1941666     4/2007
CN  101159648   4/2008
(Continued)

OTHER PUBLICATIONS

International Search Report and Written Opinion dated Oct. 12, 2016 for International Application No. PCT/US2016/039449, filed Jun. 25, 2016 (10 pages).

(Continued)

Primary Examiner — Moo Jeong
(74) Attorney, Agent, or Firm — Perkins Coie LLP

(57) ABSTRACT

Access to a wireless medium is controlled based on contention arbitration. A certain number of wireless devices are allowed by an access point to contend for a transmission opportunity. A trigger frame is used to communicate access opportunities to multiple devices. A beacon transmission may additionally be used for communication of access opportunities.

28 Claims, 13 Drawing Sheets

(51) Int. Cl.

| | | |
|---|---|---|
| *H04L 5/00* | (2006.01) | |
| *H04W 48/02* | (2009.01) | |
| *H04W 48/16* | (2009.01) | |
| *H04W 72/04* | (2009.01) | |
| *H04W 74/00* | (2009.01) | |
| *H04W 74/08* | (2009.01) | |
| *H04W 84/12* | (2009.01) | |

(52) U.S. Cl.
CPC .......... *H04L 5/0007* (2013.01); *H04L 5/0055* (2013.01); *H04W 72/0446* (2013.01); *H04W 74/002* (2013.01); *H04W 74/006* (2013.01); *H04W 74/0833* (2013.01); *H04W 74/0858* (2013.01); *H04W 48/02* (2013.01); *H04W 48/16* (2013.01); *H04W 84/12* (2013.01)

(58) Field of Classification Search
CPC ............ H04L 1/1896; H04W 74/0858; H04W 74/002; H04W 72/0446; H04W 74/0833; H04W 74/006; H04W 48/02; H04W 48/16; H04W 84/12
See application file for complete search history.

(56) References Cited

U.S. PATENT DOCUMENTS

| | | |
|---|---|---|
| 9,693,367 B2 | 6/2017 | Fang et al. |
| 2003/0161340 A1 | 8/2003 | Sherman |
| 2003/0198244 A1 | 10/2003 | Ho et al. |
| 2008/0112351 A1 | 5/2008 | Surineni et al. |
| 2011/0268054 A1 | 11/2011 | Abraham et al. |
| 2013/0170480 A1 | 7/2013 | Novak et al. |
| 2013/0286959 A1 | 10/2013 | Lou et al. |
| 2014/0119288 A1 | 5/2014 | Zhu et al. |
| 2015/0063258 A1 | 3/2015 | Merlin et al. |
| 2015/0071051 A1 | 3/2015 | Zhu et al. |
| 2015/0078230 A1 | 3/2015 | Choi et al. |
| 2015/0201434 A1 | 7/2015 | Fang et al. |
| 2016/0143010 A1 | 5/2016 | Kenney et al. |
| 2016/0157266 A1 | 6/2016 | Wang et al. |
| 2016/0262185 A1 | 9/2016 | Ghosh et al. |
| 2016/0278081 A1 | 9/2016 | Chun et al. |
| 2016/0286548 A1* | 9/2016 | Huang .................. H04L 5/0007 |
| 2016/0360443 A1 | 12/2016 | Hedayat |
| 2017/0150493 A1 | 5/2017 | Seok |
| 2017/0347372 A1 | 11/2017 | Li et al. |
| 2017/0373736 A1 | 12/2017 | Fang |
| 2018/0014316 A1* | 1/2018 | Guo .................. H04W 72/1289 |
| 2018/0027608 A1 | 1/2018 | Oh et al. |
| 2018/0035488 A1* | 2/2018 | Yang .................. H04W 74/004 |
| 2018/0084605 A1* | 3/2018 | Li .......................... H04W 84/12 |
| 2018/0167882 A1 | 6/2018 | Choi et al. |
| 2018/0263047 A1* | 9/2018 | Kim ........................ H04B 7/26 |
| 2019/0289633 A1 | 9/2019 | Fang |

FOREIGN PATENT DOCUMENTS

| | | |
|---|---|---|
| CN | 104320859 | 1/2015 |
| WO | 2015/068968 A1 | 5/2015 |
| WO | 2015/074461 A1 | 5/2015 |
| WO | 2016/127913 | 8/2016 |
| WO | 2016/163641 | 10/2016 |
| WO | 2017/220024 | 12/2017 |
| WO | 2018/094279 | 5/2018 |

OTHER PUBLICATIONS

International Search Report and Written Opinion dated May 28, 2018 for International Application No. PCT/US2017/062415, filed on Nov. 17, 2017 (13 pages).

International Search Report and Written Opinion dated Sep. 14, 2017 for International Application No. PCT/CN2017/089796, filed on Jun. 23, 2017 (8 pages).

\* cited by examiner

SLOTTED OFDMA BASED RANDOM ACCESS

CROSS REFERENCE TO RELATED APPLICATIONS

This patent document claims the benefit of priority under 35 U.S.C. § 119(a) and the Paris Convention of International Patent Application No. PCT/CN2015/082389, filed on Jun. 25, 2015, and International Patent Application No. PCT/CN2015/093777, filed on Nov. 4, 2015. This patent document also claims the benefit of priority under 35 U.S.C. § 119(e)(1) of U.S. Provisional Patent Application No. 62/354,071, filed on Jun. 23, 2016. The entire contents of the before-mentioned patent applications are incorporated by reference as part of the disclosure of this patent document.

TECHNICAL FIELD

This patent document relates to wireless communication, and in particular, access to a wireless transmission medium by multiple wireless devices.

BACKGROUND

Wireless communication systems can include a network of one or more access points (AP) to communicate with one or more wireless stations (STA). An access point can emit radio signals that carry management information, control information or users' data to one or more wireless stations, and a station can also transmit radio signals to the access point in the same frequency channel via time division duplexing (TDD) or in different frequency via frequency division duplexing (FDD).

IEEE 802.11 is an asynchronous time division duplexing technology designated for wireless local area network (WLAN). The basic unit of WLAN is a basic service set (BSS). The infrastructure BSS is the BSS with stations through associating with an Access Point (AP) to connect to the wired network or Internet. In a BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies, among other things, slotted OFDMA random access (SOFDMA) mechanism to improve the medium usage efficiency and reduce access latency in wireless communications.

In one aspect, a method is provided to commence the SOFDMA random access process via transmitting a trigger frame with indication of random access transmission opportunity (RA-TXOP) and setting the duration of RA-TXOP to protect SOFDMA procedure from interfered by other stations.

In another aspect, a method is provided for the AP to configure the periodical trigger frame transmission time in the broadcast beacon frame so that the SOFDMA stations are able to use the SOFDMA random access transmission opportunity.

In another aspect, a method is provided for stations to contend the medium in slotted OFDMA mechanism. In some embodiments, the SOFDMA random access mechanism can manage the contention time period into a couple of random access time slots in which a station could perform random access over an OFDMA sub-channel.

In another aspect, a method of expanding random access slots is provided via information field in trigger frame, so that the SOFDMA capable AP could be able to configure and change the random access duration dynamically based on the traffic load of BSS.

In another aspect, a method for quickly adapting to congestion is provided via including the OFDMA based contention window parameters in the trigger frame for apriodic random access so that the SOFMDA capable stations can update their backoff counters for the next random access period accordingly. A trigger frame may be transmitted as soon as needed, without having to wait for a next scheduled transmission of other frames such as a beacon frame.

In another aspect, a method is provided for SOFDMA capable stations to start transmitting a trigger response frame earlier when no transmission is detected in the previous random access slot. In this way, it can further help improving the medium utilization and spectrum efficiency.

In another aspect, a legacy preamble is included in the trigger response frame to allow other stations to sense the medium busy via clear channel assessment (CCA) detection mechanism and to allow the SOFDMA capable AP to detect the trigger response transmission frame. Due to identical values used in the legacy preamble field of trigger response frame, the SOFDMA mechanism allows legacy preambles transmitted by multiple stations to be detected by others stations. In addition, the legacy preamble of trigger response frame could be used to reduce the probability of false detection of trigger response frame in RA-TXOP.

In another aspect, a method of using OFDMA sub-channel distinguishable multiple trigger response frames from different stations is provided. With the orthogonal characteristics of OFDMA sub-channels, the AP could be able to distinguish the trigger response frames sent from different stations.

In another aspect, a method is provided for deferring the trigger response acknowledgement frame after the last RA slot, which would reduce the switching time between UL transmission and DL transmission.

In yet another aspect, a method of arbitrating and scheduling contending stations is provided in the trigger response acknowledgement frame. This would allow multiple winning stations to be able to transmit or receive PPDUs in scheduled manner following the random access so as to improve the transmission efficiency.

In yet another aspect, a method of differentiated negative acknowledgement (NACK) to the trigger response frame is provided to assist the SOFDMA capable stations to determine the re-transmission of random access. With the differentiated NACK, the station would be able to determine the collision condition in the current random access and take a proper action for the re-transmission.

In yet another aspect, a method is provided how to protect the random access period RA-TXOP and HE-TXOP transmission period to reduce the interference from other neighbor stations.

In yet another aspect, a method of enabling legacy EDCA random access with SOFDMA random access together is provided for the SOFDMA capable AP to have the full control of random access in the congested condition.

Details of the above aspects and their implementations are set forth in the accompanying drawings, the description and the claims.

DETAILED DESCRIPTION

This document describes techniques, mechanisms, devices, and systems for multiple stations to randomly access the medium using slotted OFDMA to improve transmission efficiency in contention based wireless communications.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
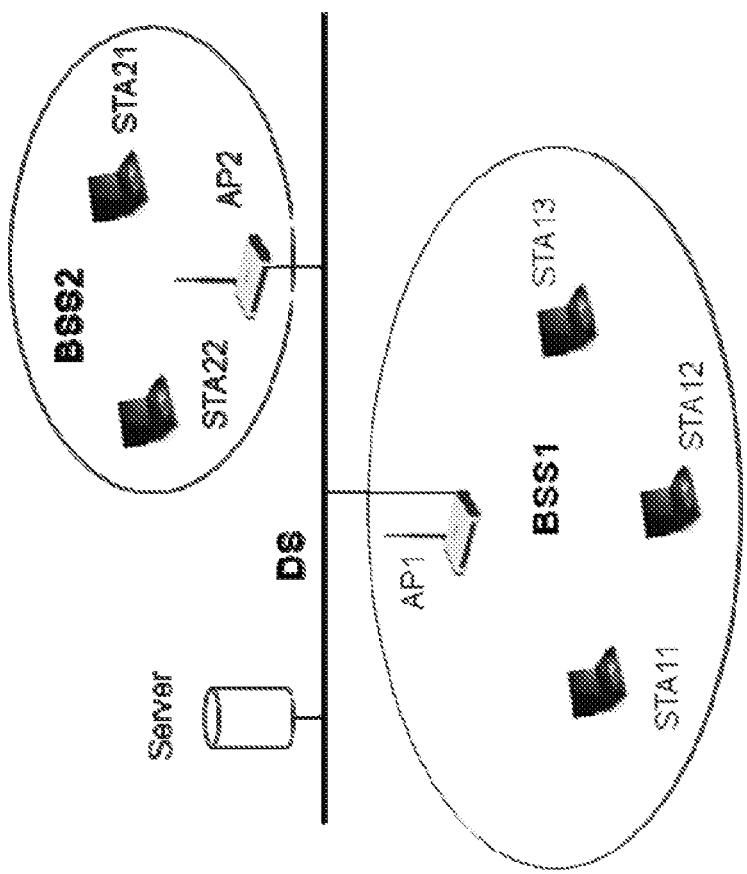
FIG. 1 shows an example of infrastructure BSS in a wireless communication system.

FIG. 1 illustrates an example of infrastructure BSS. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server or switch through a distribution system (DS) to form an Extended Service Set (ESS).

Figure 2:
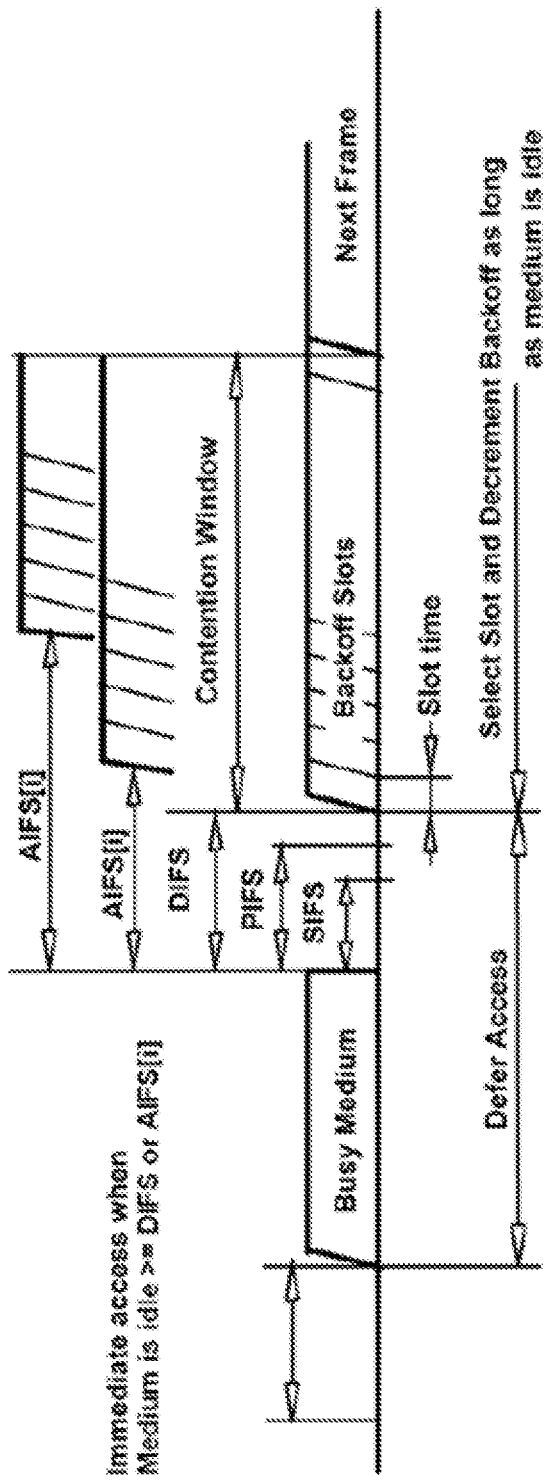
FIG. 2 shows an example of prior art CSMA/CA mechanism in DCF of IEEE 802.11.

FIG. 2 illustrates an example of a CSMA/CA mechanism used in the current 802.11 networks. A station senses the medium. If the medium is sensed busy, the station defers until the medium is determined as idle plus a period of time equal to xIFS when the last frame detected on the medium was received correctly. If the station is going to send a control frame such as ACK, then it has to wait for short interframe space (SIFS) time before transmission. If the station is going to transmit a management frame, it has to wait for the point coordination function (PCF) interframe space (PIFS). If the station is going to transmit the data frame, it has to wait for distributed (coordination function) interframe space (DIFS) or arbitration interframe space (AIFS) or enhanced interframe space (EIFS) before entering contention window.

The existing CSMA/CA mechanism used in IEEE 802.11 has significant overhead in each transmission and issue of medium utilization efficiency especially when a large number of stations share the same medium and are going to transmit simultaneously.

The present document discloses a channel random access mechanism called Slotted Orthogonal Frequency Division Multiple Access (SOFDMA). In some embodiments, the disclosed technique can be used to improve the medium utilization efficiency. In some embodiments, the disclosed technique can be used to improve user experience, e.g., by reducing transmission latency.

In one advantageous aspect, the SOFDMA random access mechanism combines certain advantages of central control function and distributed control function mechanisms. For example, in some embodiments, the SOFDMA mechanism can be implemented as a pre-contention and arbitration procedure before actual occupying the medium for UL transmission. The SOFDMA capable AP can perform EDCA based contention to acquire the medium and transmit a trigger frame to commence the SOFDMA random access procedure to allow multiple stations to simultaneously access the network using random access.

In some embodiments, instead of contending for the medium in time domain used by EDCA, SOFDMA random access mechanism manages the stations' contention in the both time and frequency domains, so as to reduce the station's waiting time in idle state while reducing the probability of collisions within a certain level.

In some embodiments, instead of judging the medium occupancy by contending stations, the SOFDMA random access mechanism allows AP to arbitrate the contentions and notify winning stations for transmissions in the following transmission opportunity, called High Efficiency Transmission Opportunity (HE-TXOP). The arbitration procedure lets the AP control and schedule UL transmissions from multiple stations so as to reduce the probability of collisions in HE-TXOP. In HE-TXOP, the single transmission from one winning station or sequential/parallel transmissions from multiple winning stations in either UL MU OFDMA or UL MU MIMO are scheduled in the trigger response acknowledgement frame (or cascading trigger frame) to reduce the switching (gap) time between downlink and uplink transmissions.

Compared to the legacy CSMA/CA mechanism, the SOFDMA mechanism could improve the medium usage efficiency significantly especially in the high density deployment scenario.

In some embodiments, to support fairness of medium sharing with legacy CSMA/CA based stations, the SOFDMA random access mechanism categorizes the medium occupancy in different time slots: legacy TXOP time slots for CSMA/CA stations to access the medium, RA-TXOP time slots for SOFDMA capable stations to random access the medium and HE-TXOP time slots for scheduled SOFDMA capable stations to access the medium. The SOFDMA capable AP is responsible to transmit the indication of the type of an upcoming transmission opportunity slot in a control frame, management frame, beacon or other type of frames such as a trigger frame to control SOFDMA capable stations to random access the medium only in RA-TXOP period. The SOFDMA capable AP can transmit such a frame (e.g., a trigger frame) as a standalone frame, e.g., as a PHY transmission by itself, periodically and/or non-periodically attaching with other frames. The SOFDMA capable AP can use broadcast beacon frame to carry the information of target trigger transmission time (TTTT) to inform SOFDMA capable stations the scheduled SOFDMA random access period.

The SOFDMA capable AP can also include the multi-user random access only (MURAO) indication in the beacon frame. This MURAO indication is used for the OFDMA capable AP to control the contention in the BSS based on the overloading condition. If an overload is detected, the AP sets MURAO=1 to disallow the stations to perform EDCA based random access so as to reduce collision. Once the station receives the MURAO indication set to 1, it may contend the medium only through RA-TXOP allocated by the trigger frame. Otherwise, when the station receives the MURAO indication set to 0, it is allowed to contend the medium in either EDCA or SOFDMA random access depending on which mechanism can acquire the medium first.

The UL MU transmissions could be categorized for scheduled UL MU transmissions and UL MU random access. If the AP knows the HE stations' buffer status, it can schedule multiple HE stations at same time to perform UL MU OFDMA or MMO transmissions. If the AP does not know the HE stations' buffer status, it may acquire RA-TXOP for multiple HE stations to perform the SOFDMA based random access simultaneously. In the RA-TXOP, the HE stations may use SOFDMA to report their buffer status, or other information which could be used by the AP to schedule UL transmissions later efficiently.

After completing RA-TXOP, the AP may schedule HE-TXOP time for scheduled UL transmissions so that HE stations could efficiently utilize the air interface.

FIG. 3 (A) shows an example of SOFDMA random access mechanism commencing from a trigger frame transmitted by the AP.

The SOFDMA random access mechanism divides the random access transmission opportunity (RA-TXOP) into a couple RA slots in time domain after the trigger frame. The number of RA slots could be from 1 to m. Each RA slot may have the same or different transmission time duration indicated by the trigger frame to allow a group of STAs to perform random access to the medium, such as in the random access slot 1, 2 or 3 (RA Slot 1, 2, or "m" shown in FIG. 3(A)). The time gap between the trigger frame and the first RA slot is xIFS time (i.e. SIFS or PIFS), and between two consecutive RA slots is SIFS.

The RA-TXOP process commences at the trigger frame sent by the SOFDMA capable AP and ends at the trigger response acknowledgement frame (TRack or TRnack) sent by the AP. The TRack or TRnack could be a frame of multi-user Block Ack (MU-BA).

When sensing the medium idle and its NAV=0, the SOFDMA capable AP transmits a trigger frame with RA-TXOP indication to notify the following time interval is used for SOFDMA based UL MU random access transmissions. The RA-TXOP indication would be a special AID defined for random access, or other parameter. The SOFDMA capable AP should set its Duration field of the trigger frame to the time used by SOFDMA process:

xIFS+m×(Ttr+SIFS)+SIFS+Ttrack where xIFS is SIFS or PIFS time for all the stations in RA-TXOP "m" is the maximum number of RA slots in RA-TXOP for the SOFDMA based UL MU random access. AP can dynamically change this setting based on the traffic load and/or number of associated stations in BSS.

Ttr is the transmission time of trigger response frame (here it assumes each trigger response frame has same transmission duration, otherwise, Ttr on different RA slot should be calculated individually) and Ttrack is the transmission time of Trigger Response Ack (or Nack) frame.

FIG. 3 (B) illustrates another example of SOFDMA mechanism. In this option, each RA slot may have the same or different transmission time duration indicated by the trigger frame to allow a group of STAs to perform random access to the medium, but there is no time gap between two consecutive RA slots.

Legacy stations and SOFDMA capable stations in OBSS could use the BSS identifier in the trigger frame to differentiate RA-TXOP of OBSS and may also use the Duration information of the trigger frame to update their NAV values. SOFDMA capable stations in the BSS may not update their NAV values to RA-TXOP duration since they may need to contend the medium via SOFDMA random access during RA-TXOP. A station that used information from the trigger frame as the most recent basis to update its NAV is permitted to reset its NAV if no Trigger Response Ack (TRack) frame is detected.

In order to prevent the hidden node situation, the SOFDMA capable AP may use a sectorization scheme to transmit a trigger frame so that only SOFDMA capable stations within the sector of the BSS will hear the trigger frame and not set the NAV. In this case, SOFDMA capable AP may transmit an omni-direction frame first to allow all stations in nearby BSSes to set their NAV, and then send a sectorized trigger frame to enable SOFDMA capable stations within the sector to perform SOFDMA based random access.

The SOFDMA capable AP may maintain a RA slot counter to calculate the RA slot elapses in the RA-TXOP. Once the AP detects the medium idle for aSlotTime (for the option in FIG. 3 (A)) or the time elapsed over the duration of the RA slot (for the option in FIG. 3 (B)), it decreases the RA slot counter by one and continue sensing the medium till the RA slot counter reaches the end in the RA-TXOP. Then the SOFDMA capable AP will transmit the trigger response acknowledgement frame to release the RA-TXOP.

If no Trigger Response (TR) frame is received during RA-TXOP period, this RA-TXOP will be released automatically.

The trigger frame can be implemented in a new frame format, or in a new information element (IE) of MAC to carry the SOFDMA related information. If SOFDMA information is carried in IE, it could be transmitted in a beacon frame, control frame or management frame.

The trigger frame (or attached to control frame, management frame, beacon frame with RA-TXOP trigger information) could be used by SOFDMA capable stations to perform timing synchronization to the timing reference of AP.

In order to provide fairness of access to the medium for legacy CSMA/CA stations and SOFDMA stations, the SOFDMA capable AP can adjust the number of RA-TXOP slots in a given period of time according to the ratio of the number of legacy CSMA/CA stations to the number of SOFDMA stations, or other ratio of access time between legacy and SOFDMA stations based on the operation policy such as access network loading. In this way, it would give fair opportunity and time of occupancy to both legacy stations and SOFDMA stations.

Figure 4:
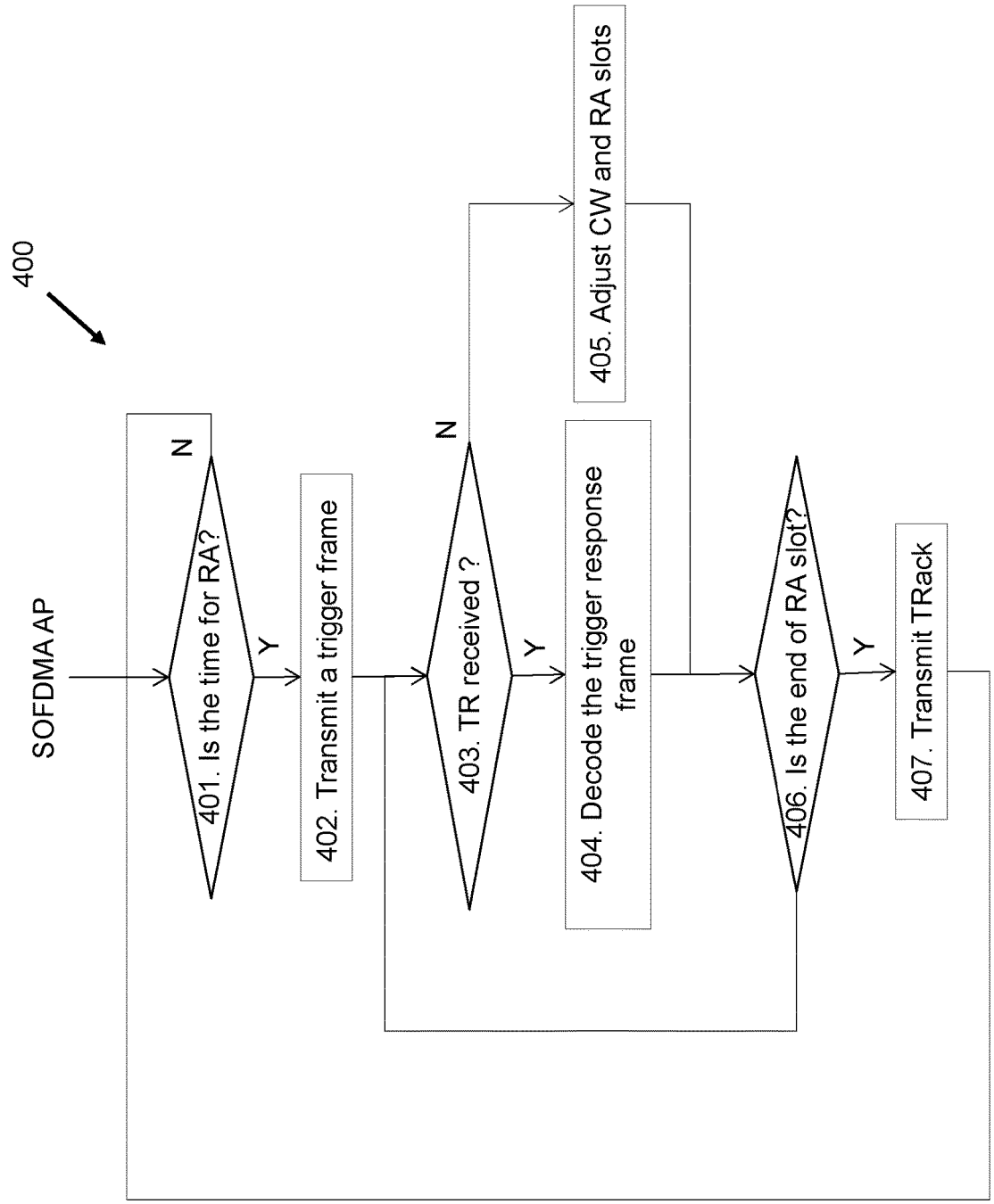
FIG. 4 shows an example of AP SOFDMA random access procedure.

FIG. 4 illustrates an example of AP's SOFDMA random access procedure.

401. The SOFDMA AP determines whether or not the next transmission time is for SOFDMA random access based on the traffic load of legacy stations and HE stations, or ratio of legacy and HE stations or other fairness policy. The AP broadcasts the target trigger transmission time in the beacon frame to notify the HE stations for the coming MU RA-TXOP so that stations would be prepared for listening to the trigger frame.

402. If the upcoming transmission time is for SOFDMA random access, the AP resets the RA counter to 0 and transmits the trigger frame to indicate commencing the SOFDMA random access, and include MU RA parameters in the trigger frame, such as:

a) the duration of RA-TXOP: the AP can estimate the length of MPDU and required RA-TXOP duration. All the stations that contend in the triggered RA-TXOP should be finished with their RA transmissions at time indicated by the RA slot in RA-TXOP Duration. If the station cannot complete transmission within one RA-TXOP, it can request more RA with "More=1", and apply frame fragmentation mechanism to combine the fragmented frames into one frame. If the station cannot fill up the entire RA slot of RA-TXOP, it can pad remaining bits with "0" till the end of RA slot;

b) the number of RA slots in the RA-TXOP: 1 to m; if m=1, it means there is only one RA slot for the random access.

c) the duration of each RA slot, or single duration value for all RA slots if they are same;

d) the OFDMA contention window size (CW min, CW max): this is optional information as it is carried in the broadcast beacon frame periodically. In order to fast adapt to the congestion condition, the AP can include this information in the trigger frame. When a HE station receives this information in trigger frame, it will replace the stored parameters received from the beacon frame and use them for following RA-TXOP;

e) the number of resource blocks used for the random access (optional), and their locations;

f) the list of stations to allow perform random access (optional): the AP can include this information to restrict a certain stations to perform the random access on the triggered RA-TXOP so as to reduce the collision probability. The default value is non-constricted, i.e. all the HE stations are allowed to perform random access in the triggered RA-TXOP;

g) trigger response acknowledgement policy. The default trigger response acknowledgement policy is set to 0, i.e. deferred trigger response acknowledgement to the end of RA slots. Otherwise, the trigger response acknowledgement policy (=1) is set to immediately acknowledge to the trigger response frame by the AP. The AP may also optionally include the allowed trigger response (i.e. random access) type information, for example the buffer status, association request, etc. in the trigger frame. The default type is to allow any response for random access. If the trigger response type is specified in the trigger frame, the HE station can transmit the frame of required frame type in the trigger response frame in RA-TXOP and other packet or padding if there still have leftover space.

403. After transmitting a trigger frame, the AP switches to receiving mode and monitors the operating channel for receiving trigger response frames.

404. If the AP receives a trigger response frame in a RA slot, it will decode the trigger response frame and process the information associated to SOFDMA transmitting station(s).

405. If the AP does not receive a trigger response frame in aSlotTime of the RA slot, it may adjust the CW min and CW max size and RA slot number to improve efficiency of future SOFDMA random access.

406. The AP continues monitoring the medium. If AP detects the medium in idle state for aSlotTime (for the option in FIG. 3. (A) or the time elapsed for the RA slot duration (for the option in FIG. 3 (B)), it decreases the RA slot counter by 1. If the trigger response acknowledgement policy is set to the deferred policy and the RA slot counter does not reach the end of RA slots, it goes to step 403 to continue monitor the channel and receiving trigger response frame. Otherwise, the AP responds the trigger response frame immediately with a TRack if the AP decodes the trigger response frame successfully. If the AP does not decode the trigger response frame (i.e. UL MU random access) over the OFDMA sub-channel, the AP can then transmit TRnack:

A) If the RSSI of trigger response frame is detected greater than a specific threshold (which means the collision might occurs), the AP will sends the TRnack with Backoff Increase indication (BOI>0) to indicate the RA transmission over the OFDMA Random Access sub-channel failure and request re-transmission with more backoff over the OFDMA RA sub-channel in next RA-TXOP. When the HE station receives the TRnack with BOI>0 over the OFDMA RA sub-channel that the random access was sent, it may double its CW size, reset its BO counter to a new random value in [0, CW] and prepare re-transmission in the next RA-TXOP.

B) If the RSSI of trigger response frame is detected below a specific threshold (which means there is no enough SNR of received frame over OFDMA RA sub-channel), the AP should send a TRnack with BOI=0. When the HE STA transmitting the MU random access over that OFDMA RA sub-channel receives this TRnack with BOI=0, it prepares re-transmission using its current backoff counter value.

The AP may include BOI information in the trigger frame to instruct the HE STA to set the contention window for the following random access and random access re-transmission.

407. If the RA slot counter reaches the end of RA slots (i.e. the maximum number of RA slots in RA-TXOP), the AP transmits the trigger response acknowledgement (TRack) frame to indicate the stations of which trigger response frames are successively received. Once the TRack is sent, the SOFDMA random access procedure is ended and RA-TXOP is released. If no trigger response frame is received in any RA slot, the AP may either transmit the trigger response acknowledgement frame without any winning station to explicitly release the current RA-TXOP, or not transmit a frame to let the current RA-TXOP released automatically.

In the TRack (or TRnack) frame, the AP may also allocate the resource blocks to schedule UL transmissions for winner stations (or for scheduling re-transmission), and switch from the random access to the scheduled access in the following HE-TXOP, e.g., aggregating the acknowledgement frame with trigger frame. Therefore HE stations could efficiently use the air interface to transmit the UL data. In this way, the stations could first report its UL buffer status using the high efficient SOFDMA random access procedure and then wait for the scheduled access to transmit a large size payload over either OFDMA or MIMO channels.

On the station side, when receiving a trigger frame with RA-TXOP indication, the SOFDMA capable stations with NAV=0 in the BSS could contend the medium using SOFDMA multiple access mechanism.

A SOFDMA capable station may be evenly distributed among RA slots of RA-TXOP to transmit trigger response frames. After receiving the trigger frame, the first group of SOFDMA capable stations may contend the medium in xIFS time via transmitting trigger response frames.

Figure 5:
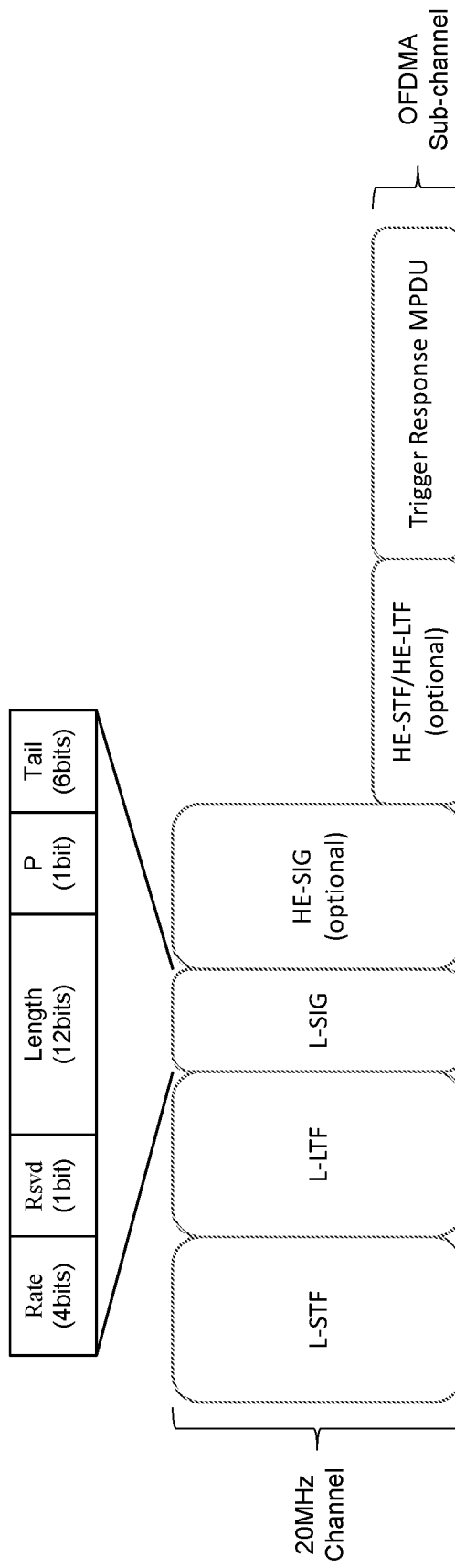
FIG. 5 shows an example of trigger response frame structure.

FIG. 5 shows an example of UL MU trigger response (e.g., random access) frame format. The trigger response frame may consist of:

a) Legacy preamble: L-STF, L-LTF and L-SIG fields
b) HE preamble: HE-SIG and HE-STF/HE-LTF field (optional)

c) Trigger Response MPDU

The legacy preamble field of trigger response frame would be used by the AP and other STAs for the timing and frequency synchronization and CCA detection so as to protect the RA-TXOP contended from legacy EDCA stations during the SOFDMA random access, when legacy stations and HE stations were deployed in the same area and on the same frequency channel. In addition, the legacy preamble field of trigger response frame could be used to identify the current contention window for UL MU SOFDMA transmissions.

The example illustrated in FIG. 5 shows fields like L-STF, L-LTF and L-SIG, which may be used for backward compatibility to the legacy STAs. When the SOFDMA stations share the same frequency channel with legacy stations, the first two sub-fields are the same as the legacy preamble so that legacy stations could detect medium occupancy with legacy CCA detection mechanism. If stations miss detecting the first two sub-fields on legacy preamble, they could apply the energy detection mechanism in the middle packet transmission to detect the medium usage status. The L-SIG field in the trigger response frame is also used for compatibility to legacy STAs, but it may be set to identical values by all SOFDMA capable stations which contend the medium in the same RA slot.

With reference to FIG. 5 which shows an example setting of various fields of the L-SIG.

a) Rate bits of L-SIG may be set to "BPSK r=½" for SOFDMA trigger response frame.

b) Reserved bit of L-SIG field may be set to "1" to indicate the SOFDMA trigger response frame.

c) Tail bits of L-SIG field may be set to "0." Parity bit P, may be set to achieve parity consistency for the L-SIG field.

d) Length bits of L-SIG may be set to "duration of remaining RA-TXOP". L-SIG Length field in trigger response frame is to protect transmission of SOFDMA random access procedure. It should be set to the duration counted from the beginning of trigger response frame to the end of Trigger Response Ack frame.

In order to make the transmission more reliable for SOFDMA capable stations, L-SIG may be duplicated.

Since all SOFDMA capable STA use the identical settings in L-SIG of trigger response frame during the contention, therefore legacy preamble fields transmitted from multiple stations would be same. This transmission characteristic can be advantageously used by the AP or the other station to simply treat the received signal as a multi-path from a single source. In other words, when multiple stations transmit the legacy preamble of trigger response frames at same time, no additional reception challenged is faced by receiving modules of the AP or another receiver, which typically are designed to mitigate effects of multipath and decode received signal.

Assuming STAs have been synchronized to AP based on the trigger frame, if the timing and frequency alignment of STAs to AP is within a certain threshold, the AP and other nearby STAs (including legacy ones) could be able to synchronize with the legacy preamble field of trigger response frame and decode the L-SIG.

Legacy preamble fields of the trigger response frame are transmitted over the entire bandwidth of 20 MHz channel to prevent the channel occupied by legacy stations, or other stations in OBSS. When a station receives a legacy preamble of the trigger response frame, it may set NAV if the station is in OBSS.

HE preamble fields shown in FIG. 5 may be used to carry the HE frame format information and training sequences.

The optional HE-SIG field, if exists, is transmitted over the entire 20 MHz channel, while HE training sequence fields, if exists, are transmitted over one OFDMA sub-channel.

Trigger Response MPDU carries the information of individual STA such as the buffered data status for UL transmission, channel or OFDMA sub-channel measurement information, etc. The trigger response MPDU should be transmitted over an OFDMA sub-channel which consists of a set of OFDM sub-carriers in 20 MHz channel.

Figure 3A:
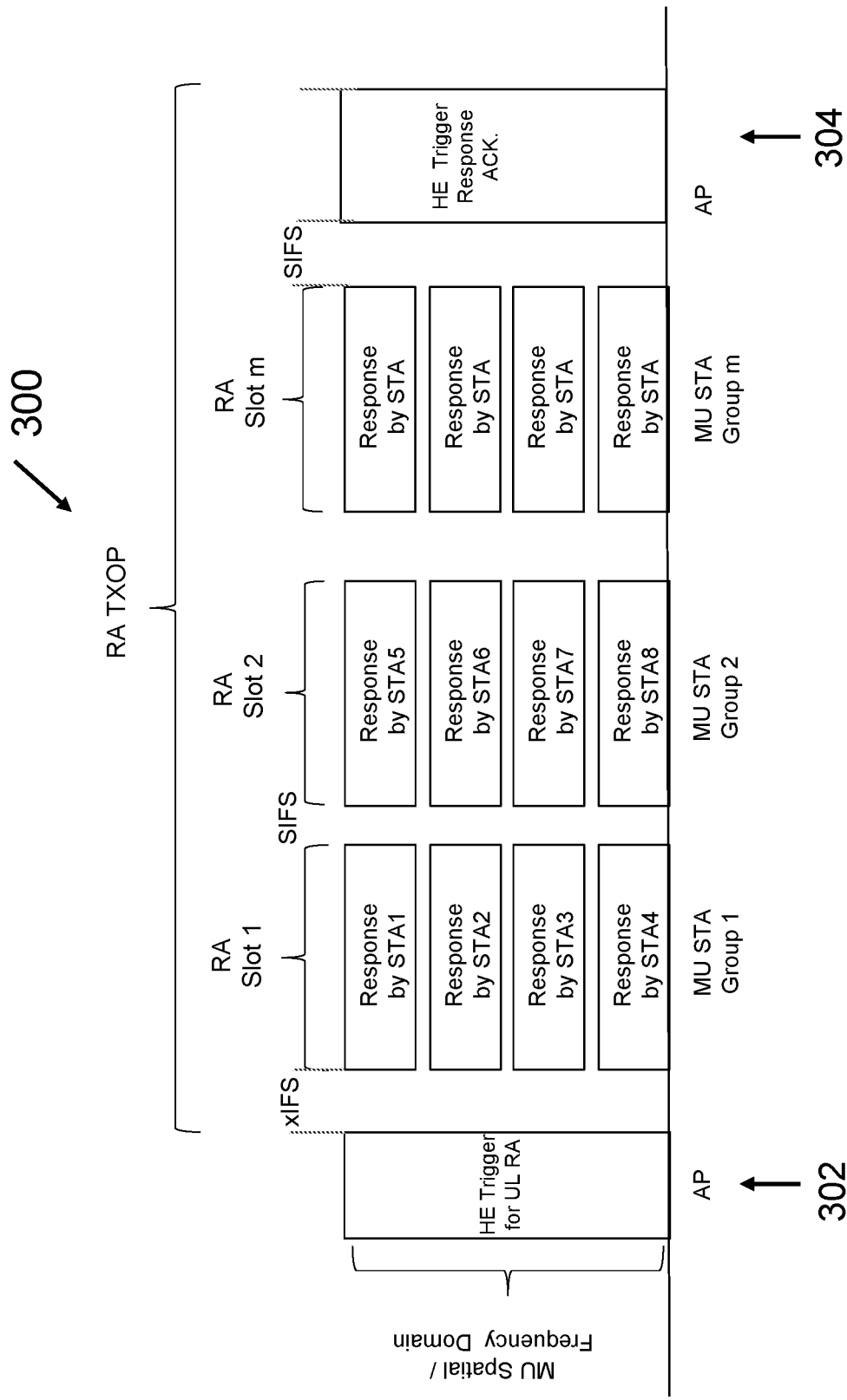
FIGS. 3A-3B show examples of SOFDMA mechanisms.
Figure 3B:
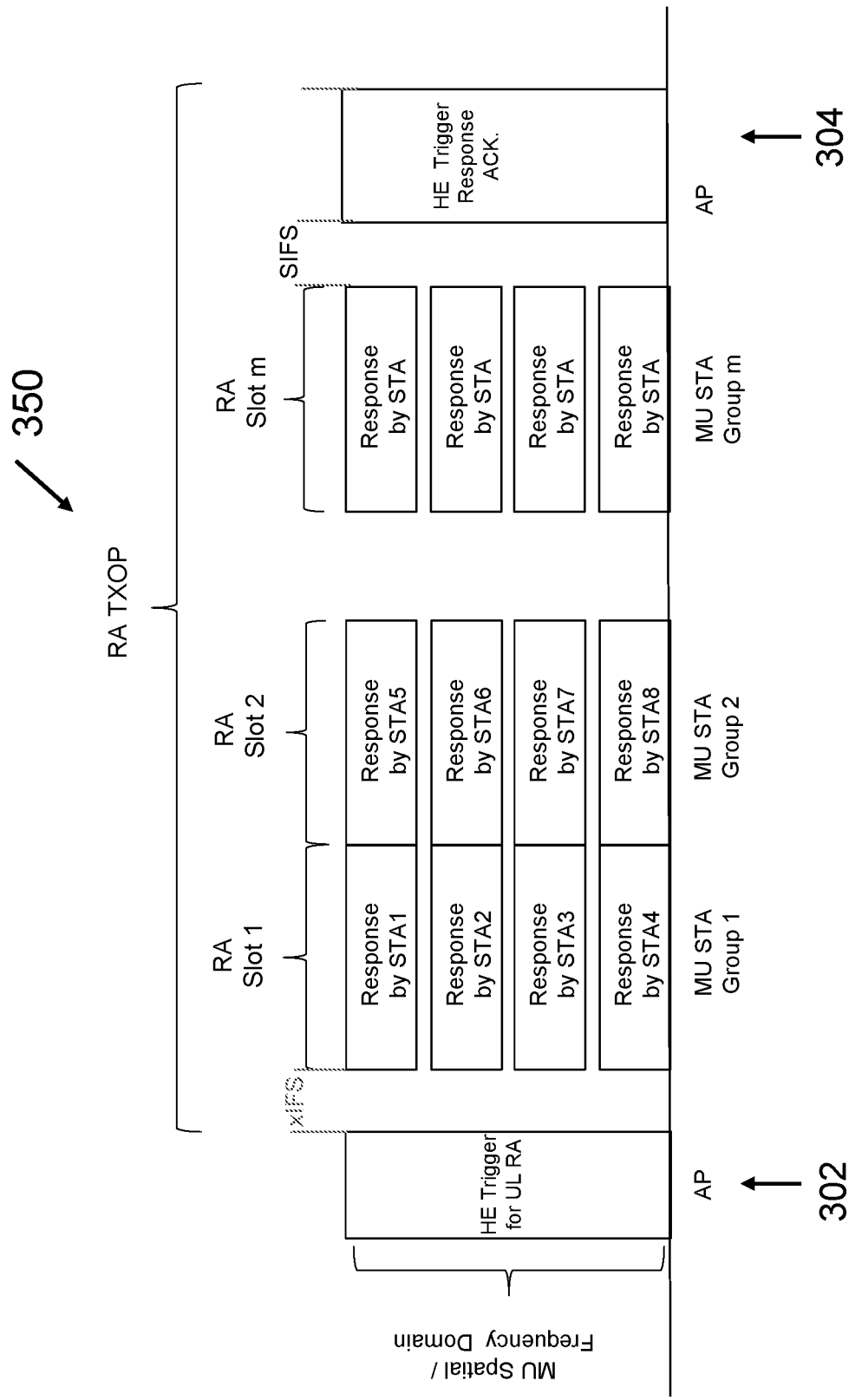

In order to evenly distribute STAs across the RA-TXOP (or multiple RA-TXOPs), a SOFDMA capable station may use a backoff (BF) counter to control the UL random access in a RA slot of RA-TXOP. Initially, the SOFDMA capable STA sets its backoff counter randomly in the range of contention window (CW) provided by the AP in either management frame like beacon, or in the trigger frame. The backoff counter uses time ticks of trigger frame, RA slot counter and idle time measurement in the unit of aSlotTime. After receiving the trigger frame, the SOFDMA capable station checks the permission for the random access and its backoff counter value, and transmits the trigger response frame in SIFS time if the backoff counter is equal to 0 and it is permitted in RA-TXOP. FIG. 3A and FIG. 3B show a group (MU STA Group 1) of STAs which backoff counters reach 0 at receiving the trigger frame. Those STAs (STA1, 2, 3 and 4) will start transmitting the trigger response frame immediately after xIFS time of the trigger frame. Other SOFDMA stations will decrease their backoff counters by 1 and continue sensing the medium for transmission opportunities in next RA slots. Once the RA slot finishes, the RA slot counter is decreased by one.

As the legacy preamble of trigger response frames from MU STAs (STA1, 2, 3, and 4) carry the same information, the legacy preambles of trigger response frame from different STAs may be viewed as multi-path signals of single legacy preamble when they arrive at the AP at different time. As long as those "multi-path signals" do not spread out too much (i.e. within a CP of OFDM symbol), the receiving stations could be able to decode them.

As HE training sequences and HE MPDU are transmitted over an OFDMA sub-channel, which are orthogonal to each other, the trigger response frames sent from different STAs do not interfere to each other even they are transmitted over the same 20 MHz channel at the same RA slot.

SOFDMA random access mechanism requires all the UL MU transmissions from different stations to be ended at the same time, i.e. at the RA slot boundary. Therefore HE MPDU from different stations may have same length even they may carry different contents. If a trigger response frame is short than a RA slot duration, some padding may be added at the end of frame to make all the transmissions ended at the RA slot boundary exactly. If the STA cannot complete its transmission within the RA slot, it can request more random access in next RA-TXOP with "More=1" in the frame header, and apply frame fragmentation mechanism to combine the fragmented frames into one MSDU frame.

After the first group of STAs (STA 1, 2, 3, an 4) complete their transmissions in RA Slot 1, other SOFDMA stations will detect the medium in the idle state for aSlotTime or time elapsed for a RA slot duration from the beginning of the RA slot. The SOFDMA stations will decrease their backoff counters by one. If their counters reach 0, the second group of stations (STA 5, 6, 7 and 8) would start their transmissions of trigger response (i.e. random access) frames in the second slot (RA Slot 2), i.e. in SIFS after the first RA slot ends (for the option in FIG. 3. (A)) or would start their transmissions of trigger response frames in the second slot (RA Slot 2) immediately (for the option in FIG. 3 (B)).

Figure 6:
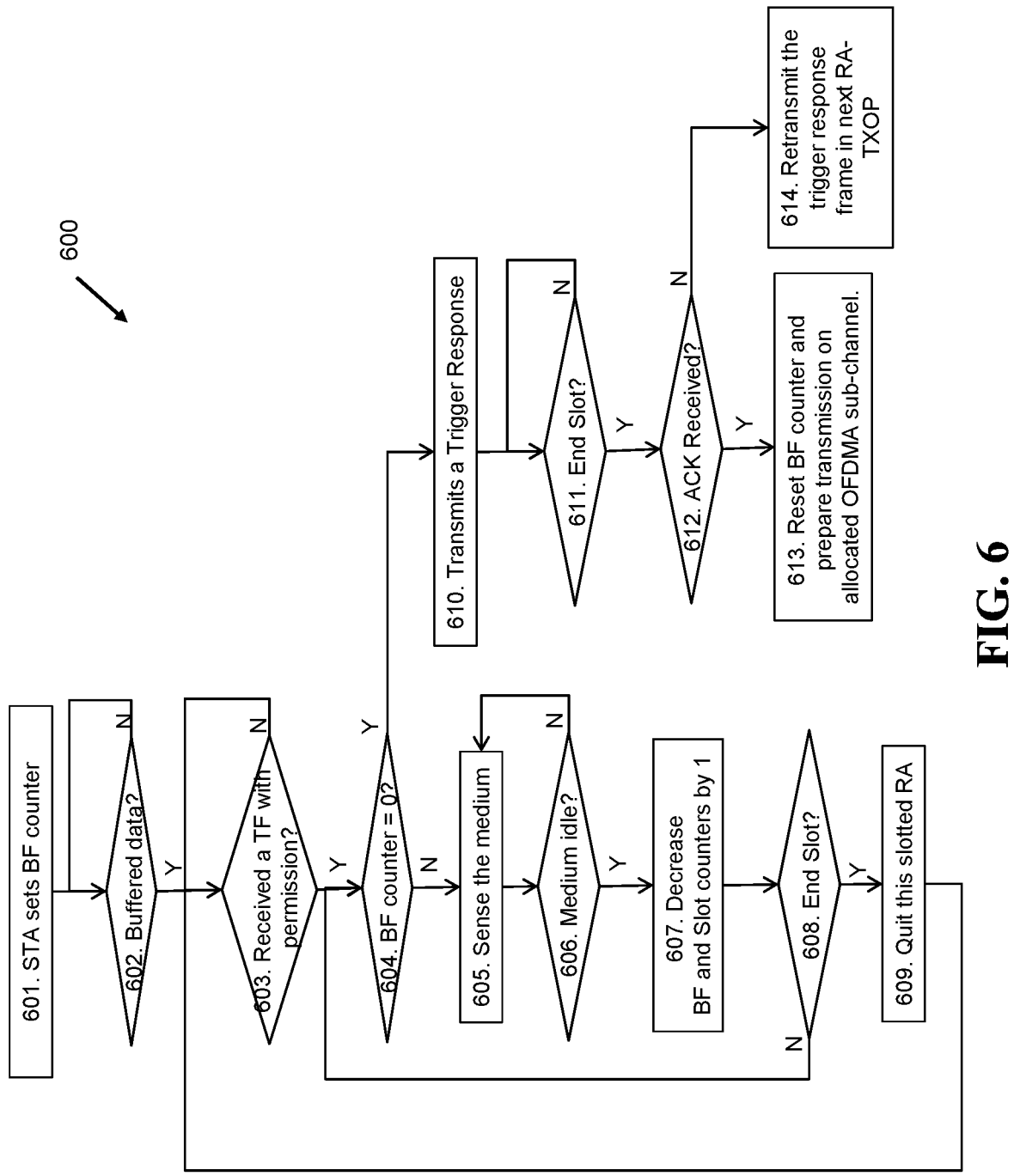
FIG. 6 shows an example of trigger response procedure.

FIG. 6 illustrates an example of trigger response frame transmission procedure.

601. A station sets its backoff counter value randomly between 0 and CW, where CW is the size of the contention window between CW min and CW max which are received from the SOFDMA AP in beacon frame or trigger frame.

602. if the station has some buffered data for UL transmissions, it will enter the SOFDMA random access procedure.

603. the station senses the channel and waits for a trigger frame from its BSS to commence RA-TXOP. After receiving a trigger frame, the station checks whether it is allowed to contend in the current RA-TXOP. If the station is not in the permitted station list, it will continue monitoring the channel for next RA-TXOP. Otherwise, the station will reset the RA slot counter to the value specified in the trigger frame.

604. the station checks its backoff counter value.

605. if the value of backoff counter is greater than 0, the station continues sensing the medium for transmission opportunity in next RA slots. Alternatively, if the station detects legacy preamble of trigger response frame from other stations, it may go to sleep for about RA slot duration time and wake up before the end of the RA slot to continue monitoring transmissions. Therefore it may save power of the station.

606. the station senses the medium until the medium becomes idle (for the option in FIG. 3 (A)), or the current RA slot is ended (for the option in FIG. 3 (B)).

607. if the station detects the medium in idle for aSlotTime (for the option in FIG. 3 (A)) or the RA slot time expired (for the option in FIG. 3(B)), it will decrease its backoff counter and the slot counter by 1.

608. if the slot counter does not reach the end of RA slots in RA-TXOP, the station will go to the step 4 to check whether the backoff counter reaches 0 for transmitting trigger response frame.

609. if the slot counter indicates it is the end of RA slots in RA-TXOP, the station will keep the current value of backoff counter and quit the current RA-TXOP procedure and wait for opportunity in next RA-TXOP.

610. if the backoff counter reaches 0, it indicates the current RA slot is for the station to transmit the trigger response frame. The station transmits a trigger response frame in xFIS time after receiving the trigger frame if the RA slot is the first RA slot in RA-TXOP, or in SIFS time from the previous RA slot end boundary (for the option in FIG. 3 (A)), or immediately following the previous RA slot (for the option in FIG. 3(B)).

611. after transmitting the trigger response frame, the station waits until the end of RA slots to receive the trigger response acknowledgement frame if the trigger response acknowledgement policy is set to the deferred trigger response acknowledgement in the trigger frame. Otherwise, the station may check the acknowledgement frame immediately after sending out the trigger response frame.

Alternatively, the station may go to sleep for every RA slot till the end of RA slots so as to save power if the trigger response acknowledgement policy is set to the deferred trigger response acknowledgement in the trigger frame.

612. the station checks whether the trigger response ack (TRack or TRnack) frame is received.

613. if the TRack frame is received successfully, which indicates the SOFDMA RA procedure succeeds, the station can reset the backoff counter to a new value between 0 and CW. If the AP provides the UL scheduling information in the TRack frame (or TRack combining with Trigger frame) for winning SOFDMA stations to transmit UL data, the winning SOFDMA station can transmit UL data over either allocated OFDMA sub-channels or full bandwidth via UL MIMO at the scheduled time.

614. otherwise, if the SOFDMA station does not receive the acknowledgement to its trigger response frame or receives a TRnack, it needs to prepare for re-transmission.

A) If the HE station receives a TRnack (or TRnack combined with Trigger frame) with BOI>0 over the OFDMA RA sub-channel that the random access was sent, it can double the CW size and re-select a random value between [0, CW] for the backoff counter, and wait for the next RA-TXOP to retransmit the trigger response frame.

B) If the HE STA transmitting the MU random access over that OFDMA RA sub-channel receives a TRnack with BOI=0, it can prepare re-transmission using its current backoff counter value.

Assuming N OFDMA sub-channels could be used for transmitting individual trigger response frames without collision. When a SOFDMA capable station acquires a RA slot, it can select one of N OFDMA sub-channels. As the total number of OFDMA sub-channels is limited by OFDM resource blocks, it is not practical for a station to get a permanent OFDMA sub-channel for random access. In other words, N OFDMA sub-channels have to be shared by all the SOFDMA stations for UL random access.

In order to evenly distribute the SOFDMA STAs over the limited OFDMA sub-channels, i.e. the number of resource blocks (RB), an associated station may select the OFDMA sub-channel for random access via the operation of (its AID mod RB), as an example. For the un-associated station, it may randomly pick-up a number between [0, RB−1] of OFDMA sub-channel.

The OFDMA AP could use the number of RA slots to control the initial access latency and use the (CW min, CW max) to prevent from a large number of stations to access the medium at same RA-TXOP.

If the AP detects many empty RA slots in a RA-TXOP, the AP could reduce the CW min.

If the AP detects collisions in many OFDMA sub-channels, it could increase the CW min.

If there are many associated stations in BSS, the AP could increase the number of RA slots to allow more stations to perform random access in a RA-TXOP and reduce the access delay.

In some cases, none of backoff counter of SOFDMA stations reaches 0 when receiving a trigger frame from the AP. Therefore, no station is able to transmit the trigger response frame in the first RA slot even they have some buffered data for UL transmission. In this saturation, the RA slot in RA-TXOP is empty and wasted.

Figure 7A:
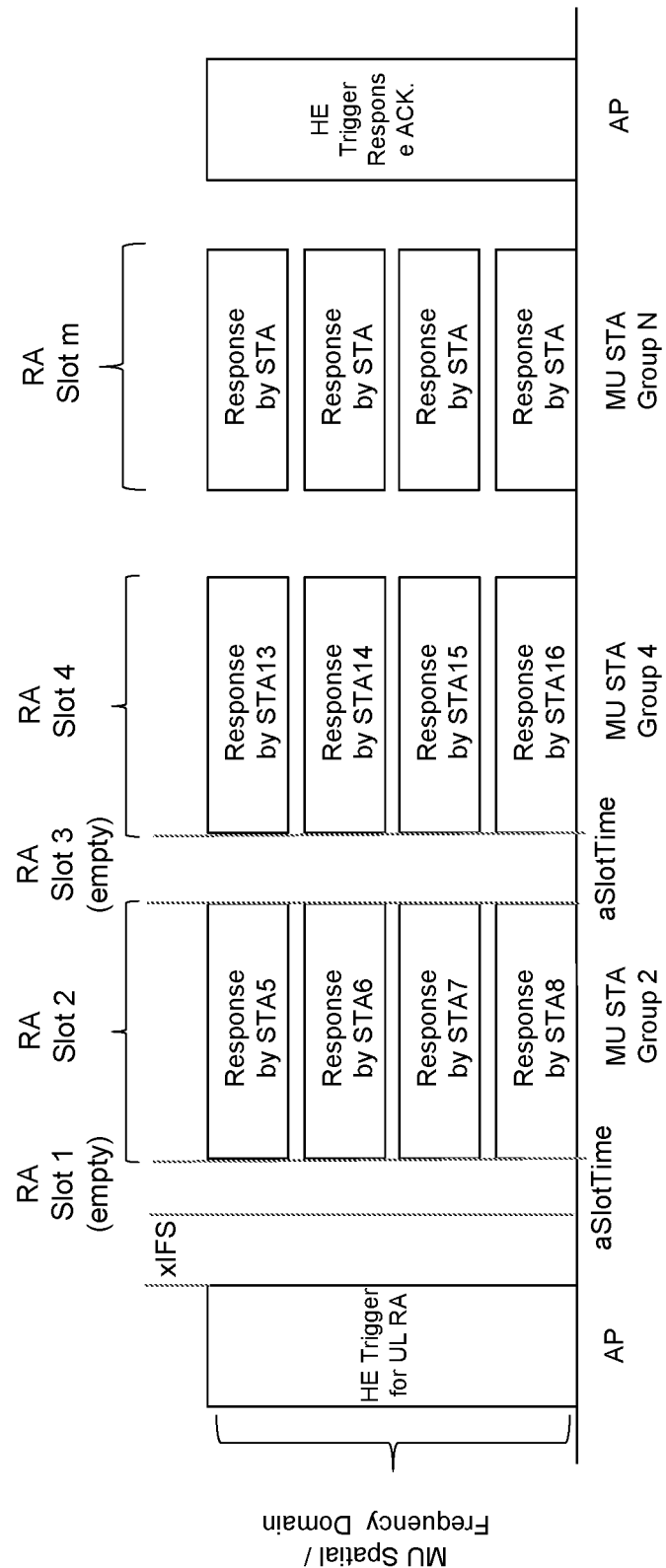
FIGS. 7A-7B show examples of SOFDMA based random access with early response.

FIG. 7A shows the example of SOFDMA based random access with early response to reduce such waste of RA slot.

If permitted for random access in the RA-TXOP, a SOFDMA station with the backoff counter=0 will transmit a trigger response frame in xIFS time after receiving the trigger frame. Other SOFDMA stations with backoff counter>0 should decrease the backoff counter and RA slot counter by one after receiving the trigger frame and continue sensing the medium (i.e. not belonging to RA slot 1). If no transmission is detected for aSlotTime after the beginning of RA Slot 1 (i.e. RA Slot 1 is empty) and the backoff counter reaches 0, the station can transmit a trigger response frame in aSlotTime from the starting time of RA Slot 1 (i.e. xIFS+aSlotTime from the trigger frame). In this way, the trigger response frame in the second RA slot would be moved forward once the station knows the previous RA slot is empty, and it is not necessary to wait till the empty RA slot ends. Therefore it could reduce the air time waste. Similarly, other stations STA13, 14, 15, 16 in the group 4 will continue sensing the medium. If no transmission is detected for aSlotTime in the RA Slot 3, the backoff counter reaches 0 and the counter of RA slot does not reach the end in RA-TXOP, those stations can transmit the trigger response frame at the RA slot advanced.

The early response will reduce the time waste of an empty RA slot to aSlotTime so as to improve the air time efficiency.

In order to save power, a SOFDMA capable station is not necessary to wake up all the time to monitor the channel during RA-TXOP. Instead, it can sleep most of time in RA Slots which it does not transmit. According to the received legacy preamble of trigger response frame, the SOFDMA capable station can set up its wakeup timer to wake up just before the current RA slot ends so that it can start monitor the medium and catch up the idle period between two RA slots.

Figure 7B:
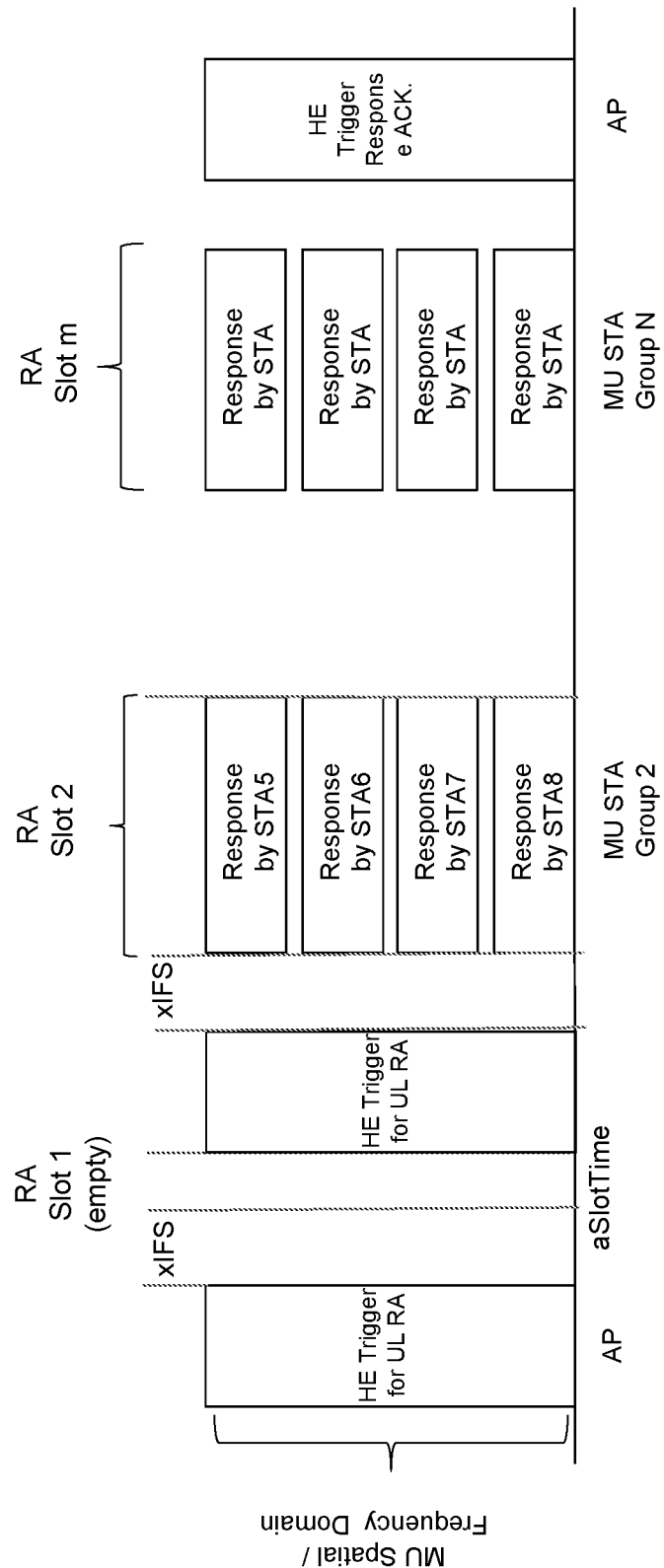

FIG. 7B shows another example of early response to trigger frame.

In this approach, it is the AP that controls the early response transmission if the empty RA slot is detected. When the AP sends out a trigger frame, it switches to the receiving mode to detect the trigger response frames from SOFDMA stations. If the AP does not receive any trigger response frame in an aSlotTime after the RA slot begins, it means the current RA slot is empty and the AP may send a new trigger frame to request the next and following SOFDMA STA groups to transmit earlier based on new trigger frame, instead of waiting till the end of current RA slot duration.

In order to save the power, a SOFDMA station with its backoff counter>0 should detect the trigger response frame or a new trigger frame in aSlotTime in the RA slot, If it detects a trigger response frame sent by other SOFDMA station(s), it may go to the sleep for about (RA slot time—aSlotTime) and wake up just before the current RA slot ends to continue monitor the channel. If the SOFDMA station detects an empty RA slot, it may continue monitor the channel for a short period of time. If a new trigger frame after aSlotTime of the beginning of empty RA slot is detected, it will decode the trigger frame and may respond the trigger frame earlier than original scheduled slot time according the information in the new trigger frame.

Figure 8:
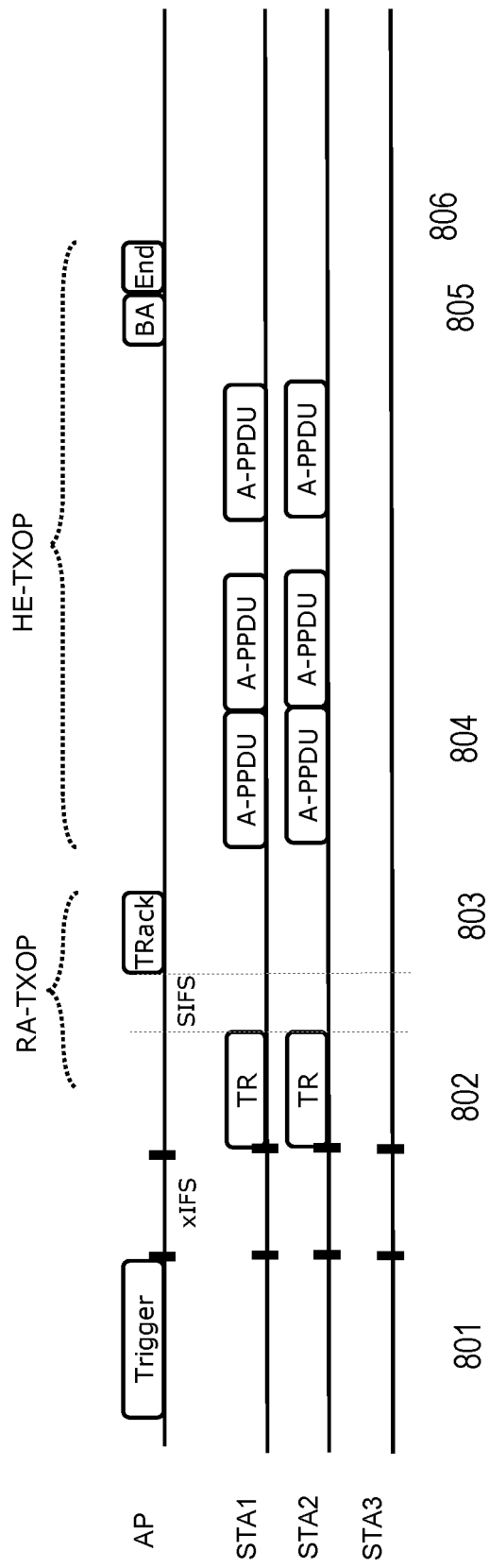
FIG. 8 shows an example of transmission in HE-TXOP.

FIG. 8 shows an example timeline of transmissions in HE-TXOP of stations winning in RA-TXOP. As seen from top to bottom of the drawing, with time increasing from left to right, the following sequence of events may take place:

801. The SOFDMA AP transmits a trigger frame indicating random access after detecting medium idle and its NAV=0. The SOFDMA AP sets the Duration field of the trigger frame to the time required by SOFDMA process. Legacy stations and SOFDMA stations in OBSS may use the Duration information to update their NAV values. Non-AP SOFDMA stations in the BSS use the training sequence of trigger frame to perform timing synchronization with the SOFDMA AP.

802. After xIFS time, the SOFDMA stations, STA1 and STA2, check their NAV values (=0) and contend the medium via SOFDMA random access mechanism. STA1 and STA2 transmit a trigger response frame respectively at same time.

803. After detecting the legacy preamble of trigger response frames from stations STA1 and STA2, the AP responds with a trigger response acknowledgement frame (TRack) at the end of RA slots to indicate that trigger response frames were received. The AP can combine the TRack with a new trigger frame to schedule the winning stations to transmit in the next HE-TXOP immediately.

804. The station STA1 and STA2 transmit A-PPDU frames over OFDMA sub-channels at same time in HE-TXOP.

805. After receiving A-PPDU packets from STA1 and STA2, the AP sends BA to STA1 and STA2 to confirm the reception.

806. The AP may terminate the HE-TXOP via sending an implicit HE-TXOP End indication in BA frame or explicit HE-TXOP End frame. Upon the HE-TXOP being terminated, other stations that used information from TRack as the most recent basis to update their NAVs are permitted to reset their NAVs accordingly.

Figure 9:
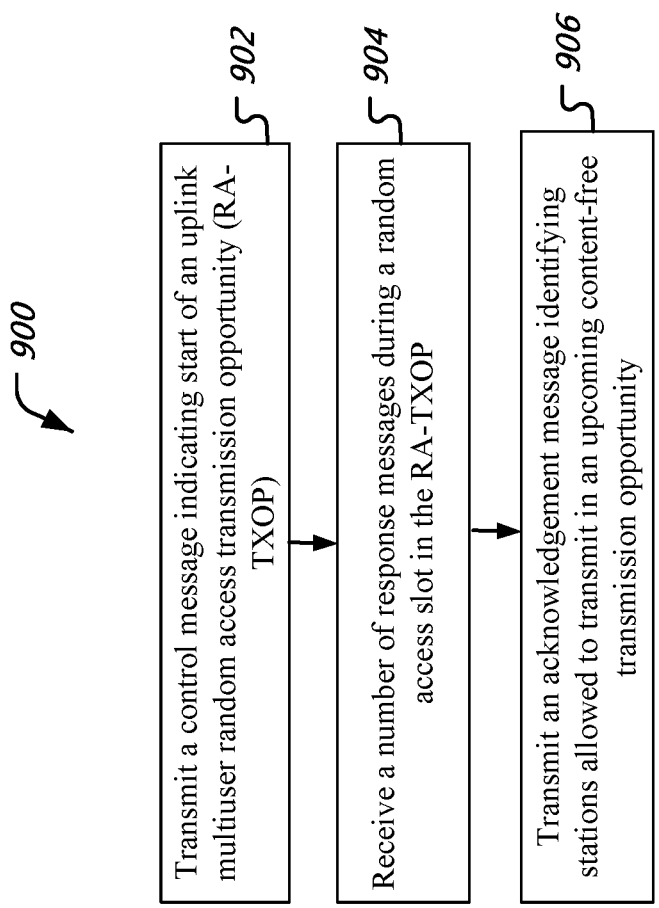
FIG. 9 shows an example method of wireless communication implemented by an access point.

FIG. 9 illustrates a flowchart for an example 900 of controlling operation of a wireless network comprising an access point and a plurality of stations.

At 902, the method 900 includes transmitting, by the access point, a control message comprising a parameter indicating start of an uplink multiuser random access transmission opportunity (RA-TXOP) during which multiple of the plurality of stations are permitted to attempt uplink transmissions using orthogonal frequency division multiplexing access (OFDMA). In some embodiments, the control message may identify the set of stations permitted to contend in the medium in RA-TXOP from the plurality of stations.

At 904, the method includes receiving a number of response messages at a random access slot in the RA-TXOP. In some embodiments, the response messages may be received by monitoring a wireless channel for a first legacy preamble and decoding one or more response messages over OFDMA sub-channels when the first legacy preamble is detected. As discussed with respect to FIG. 5, the legacy preamble may include L-STF, L-LTF and L-SIG fields.

At 906, the method 900 includes receiving a number of response messages at a random access slot in the RA-TXOP.

At 908, the method 900 includes transmitting, based on identities of stations that sent the number of response messages, an acknowledgement message identifying stations allowed to transmit in the extended TXOP. In some embodiments, the acknowledge message may be transmitted by deferring transmission of the acknowledgement message when a trigger response acknowledgement policy is set to deferred and combining all acknowledgements into a single message.

As described herein, the first message may include least some of the following fields: a duration of random access transmission opportunity, a number random access slots of RA-TXOP, a duration of each random access slot, minimum and maximum contention windows sizes used for random access, and a trigger response acknowledgement policy.

Figure 10:
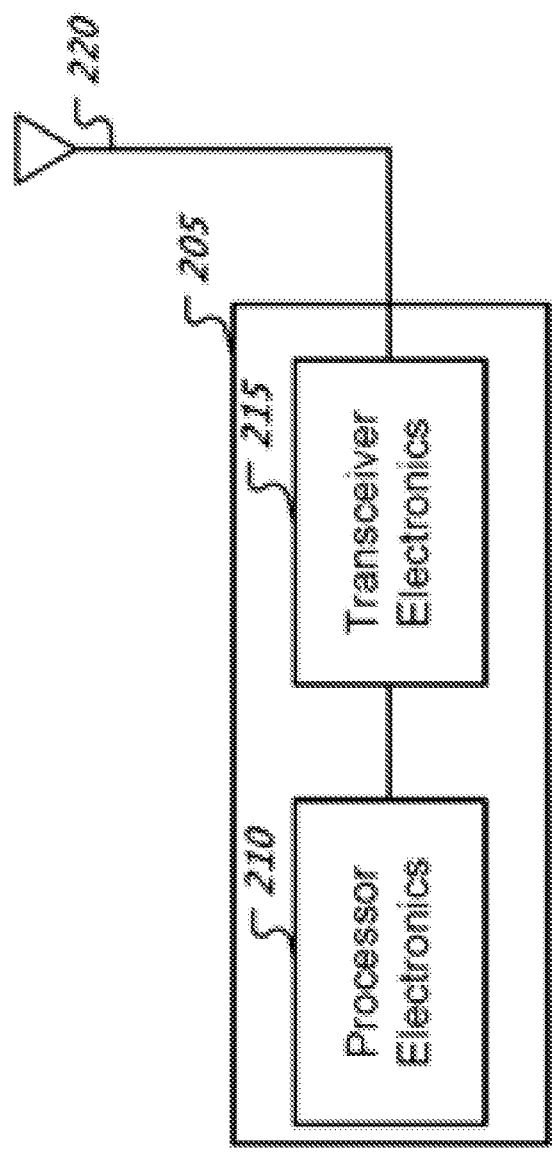
FIG. 10 shows an example wireless communication apparatus.

FIG. 10 is a block diagram representation of a portion of a radio station 205. A radio station 205 such as a base station or a wireless device can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215. The radio station 205 may be used to implement the AP-side or the STA-side techniques described in this document. Further, the processor electronics may include a memory for storing data or instructions.

Figure 11:
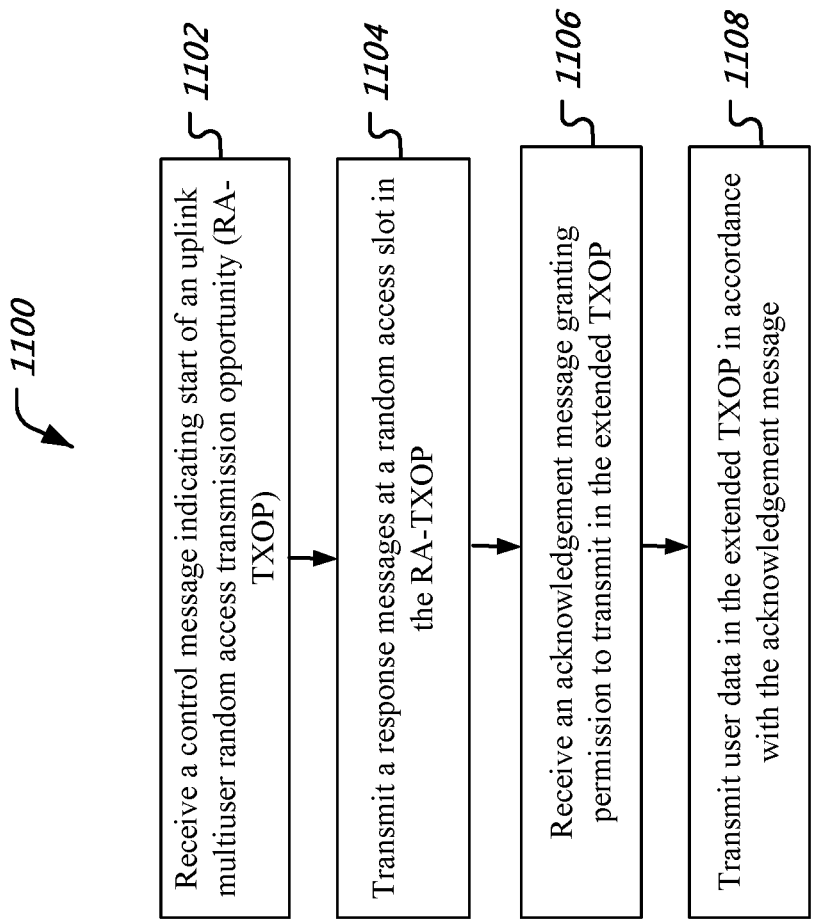
FIG. 11 shows an example method of wireless communication implemented by a wireless station.

FIG. 11 illustrates a flowchart for an example method 1100 of wireless communication. The method 1100 includes, at 1102, receiving a control message indicating start of an uplink multiuser random access transmission opportunity (RA-TXOP). The method 1100 includes, at 1104, transmitting a response messages at a random access slot in the RA-TXOP. The method 1100 includes, at 1106, receiving an acknowledgement message granting permission to transmit in the extended TXOP. The method 1100 includes, at 1108, transmitting user data in the extended TXOP in accordance with the acknowledgement message.

The SOFDMA capable AP may use the MU RA Only indication (MURAO) to control the HE stations to perform random access via EDCA mechanism. If the AP detects the traffic load congested in its BSS, it may set MURAO=1 in beacon frame to disallow HE stations to use EDCA to random access the medium so as to reduce congestion. Once this indication is set, the HE STA will only perform the MU random access through RA-TXOP specified and controlled by the trigger frame. Otherwise, the HE STA can perform random access in either EDCA or OFDMA based MU RA in parallel.

It will be appreciated that techniques for managing access to a wireless communication medium are disclosed. In some embodiments, a periodic transmission opportunity is allocated to a station for its transmissions in a slotted OFDMA random access transmission time. It will further be appreciated that techniques for using a control frame, e.g., a trigger frame are disclosed. Because a trigger frame can be transmitted at a regular time period, the use of trigger frame advantageously enables an AP to perform fast congestion control.

It will further be appreciated that techniques of performing NACK based re-transmission are disclosed. It will also be appreciated by a person of skill in the art that using the disclosed SOFDMA and existing EDCA techniques, an AP could effectively control congestion so that during the congestion, AP can disable EDCA to gain more control. The beacon frame may be used to dynamically enable or disable EDCA for RA in the BSS.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this

What is claimed is what is described and illustrated, including:

1. A method of controlling operation of a wireless network comprising an access point and a plurality of stations, comprising:
   transmitting, by the access point, a control message comprising a parameter indicating start of an uplink multiuser random access transmission opportunity (RA-TXOP) during which multiple of the plurality of stations are permitted to attempt uplink transmissions using orthogonal frequency division multiplexing access (OFDMA);
   receiving a number of response messages from the multiple stations during a random access slot in the RA-TXOP; and
   transmitting, based on identities of stations that sent the response messages, an acknowledgement message identifying which of the multiple stations have succeeded and/or are allowed to transmit in an upcoming arbitrated contention-free transmission opportunity,
   wherein the control message further includes an acknowledgement policy parameter having a first value or a second value different from the first value, the first value indicating defering sending the acknowledgement message to an end of the random access slot and the second value indicating sending the acknowledgement message immediately after the response message.

2. The method of claim 1, wherein the control message includes at least some of the following fields: a duration of random access transmission opportunity, a number random access slots of RA-TXOP, a duration of each random access slot, and minimum and maximum contention windows sizes used for random access.

3. The method of claim 2, wherein a backoff counter value of the random access has a value in range [0, CW], where CW is initially within a CW min to CW max range.

4. The method of claim 3, further including:
   changing values of CW min and CW max based on a network load condition.

5. The method of claim 1, wherein transmitting the control message includes
   identifying a set of stations from the plurality of stations that are permitted to contend in a medium in RA-TXOP.

6. The method of claim 1, wherein the receiving the number of response messages includes:
   monitoring a wireless channel for a first legacy preamble; and
   decoding one or more response messages over OFDMA sub-channels when the first legacy preamble is detected.

7. The method of claim 6, wherein the legacy preamble includes L-STF, L-LTF and L-SIG.

8. The method of claim 1, wherein transmitting the acknowledgement message includes:
   deferring transmission of the acknowledgement message upon determination that the acknowledgement message is deferred; and
   combining all acknowledgements into a single message.

9. The method of claim 1, wherein the control message is transmitted periodically or aperiodically based on an operating condition of the wireless network.

10. The method of claim 1, further comprising:
    transmitting at least one random access parameter indicative of a characteristic of the control message in a beacon frame transmission.

11. The method of claim 1, further including:
    detecting collisions while receiving the number of response frames; and
    transmitting an indication to increase backoff in a next RX-TXOP or a next control message transmission.

12. The method of claim 1, further comprising:
    switching, after the transmitting the control message, to a receiving mode to detect response messages within a period after the RA-TXOP begins, and when no response messages are detected, sending a next control message earlier than end of current random access opportunity duration.

13. An apparatus for controlling operation of a wireless network comprising an access point and a plurality of stations, comprising:
    a memory that stores instructions; and
    a processor that reads the instructions from the memory and implements a method, the instructions comprising:
    instructions for transmitting, by the access point, a control message comprising a parameter indicating start of an uplink multiuser random access transmission opportunity (RA-TXOP) during which multiple of the plurality of stations are permitted to attempt uplink transmissions using orthogonal frequency division multiplexing access (OFDMA);
    instructions for receiving a number of response messages at a random access slot in the RA-TXOP; and
    instructions for transmitting, based on identities of stations that sent the number of response messages, an acknowledgement message identifying stations allowed to transmit in an extended TXOP,
    wherein the control message further includes an acknowledgement policy parameter having a first value or a second value different from the first value, the first value indicating defering sending the acknowledgement message to an end of the random access slot and the second value indicating sending the acknowledgement message immediately after the response message.

14. The apparatus of claim 13, wherein the control message includes at least some of the following fields: a duration of random access transmission opportunity, a number random access slots of RA-TXOP, a duration of each random access slot, and minimum and maximum contention windows sizes used for random access.

15. The apparatus of claim 13, instructions further includes:
    instructions for identifying a set of stations from the plurality of stations that are permitted to contend in a medium in RA-TXOP.

16. The apparatus of claim 13, wherein the instructions further include:
    instructions for monitoring a wireless channel for a first legacy preamble; and
    instructions for decoding one or more response messages over OFDMA sub-channels when the first legacy preamble is detected.

17. The apparatus of claim 16, wherein the legacy preamble includes L-STF, L-LTF and L-SIG.

18. The apparatus of claim 13, wherein the instructions further include:

instructions for deferring transmission of the acknowledgement message upon determination that the acknowledgement message is deferred; and
instructions for combining all acknowledgements into a single message.

19. The apparatus of claim 13, wherein the instructions further include:
   instructions for detecting collisions while receiving the number of response frames; and
   instructions for transmitting an indication to increase backoff in a next RX-TXOP or a next control message transmission.

20. The apparatus of claim 13, wherein the instructions further include:
   instructions for switching, after the transmitting the control message, to a receiving mode to detect response messages within a time period after a random access opportunity begins, and when no response messages are detected, sending a next control message earlier than end of current random access opportunity duration.

21. A method of controlling operation of a wireless network comprising an access point and a plurality of wireless stations, comprising:
   receiving, by a wireless station, a control message comprising a parameter indicating start of an uplink multiuser random access transmission opportunity (RA-TXOP) during which multiple of the plurality of stations are permitted to attempt uplink transmissions using orthogonal frequency division multiplexing access (OFDMA);
   transmitting, by the wireless station, a response message at a random access slot specified in the RA-TXOP;
   receiving, for the response message, an acknowledgement message identifying granting permission to transmit in an extended TXOP; and
   transmitting user data in the extended TXOP in accordance with the received acknowledgement message,
   wherein the control message further includes an acknowledgement policy parameter having a first value or a second value different from the first value, the first value indicating defering sending the acknowledgement message to an end of the random access slot and the second value indicating sending the acknowledgement message immediately after the response message.

22. The method of claim 21, wherein the control message includes at least some of the following fields: a duration of random access transmission opportunity, a number random access slots of RA-TXOP, a duration of each random access slot, and minimum and maximum contention windows sizes used for random access.

23. The method of claim 21, wherein the transmitting the response message includes:
   setting a backoff counter to an integer value;
   decreasing the backoff counter after each RX-TXOP duration after receiving the control message;
   selectively transmitting the response message after a shortened time interval after a prior RX-TXOP designated for another wireless station when the backoff counter has reached zero and no transmission is detected in the prior RX-TXOP after a shortened time duration.

24. An apparatus for controlling operation of a wireless network comprising an access point and a plurality of stations, comprising:
   a memory that stores instructions; and
   a processor that reads the instructions from the memory and implements a method, the instructions comprising:
   instructions for receiving, by a wireless station, a control message comprising a parameter indicating start of an uplink multiuser random access transmission opportunity (RA-TXOP) during which multiple of the plurality of stations are permitted to attempt uplink transmissions using orthogonal frequency division multiplexing access (OFDMA);
   instructions for transmitting, by the wireless station, a response message at a random access slot specified in the RA-TXOP;
   instructions for receiving, for the response message, an acknowledgement message identifying granting permission to transmit in an extended TXOP; and
   instructions for transmitting user data in the extended TXOP in accordance with the received acknowledgement message,
   wherein the control message further includes an acknowledgement policy parameter having a first value or a second value different from the first value, the first value indicating defering sending the acknowledgement message to an end of the random access slot and the second value indicating sending the acknowledgement message immediately after the response message.

25. The apparatus of claim 24, wherein the control message includes at least some of the following fields: a duration of random access transmission opportunity, a number random access slots of RA-TXOP, a duration of each random access slot, and minimum and maximum contention windows sizes used for random access.

26. The apparatus of claim 24, wherein the instructions for transmitting the response message include:
   instructions for setting a backoff counter to an integer value;
   instructions for decreasing the backoff counter after each RX-TXOP duration after receiving the control message;
   instructions for selectively transmitting the response message after a shortened time interval after a prior RX-TXOP designated for another wireless station when the backoff counter has reached zero and no transmission is detected in the prior RX-TXOP after a shortened time duration.

27. A wireless communication network comprising an access point and multiple wireless stations,
   wherein the access point stores in a first memory instructions causing the access point to:
      transmit a control message comprising a parameter indicating start of an uplink multiuser random access transmission opportunity (RA-TXOP) during which multiple of the plurality of stations are permitted to attempt uplink transmissions using orthogonal frequency division multiplexing access (OFDMA);
      receive a number of response messages from the multiple stations during a random access slot in the RA-TXOP; and
      transmit, based on identities of stations that sent the response messages, an acknowledgement message identifying which of the multiple stations have succeeded and/or are allowed to transmit in an upcoming arbitrated contention-free transmission opportunity; and
   wherein each of the plurality of wireless stations store in a second memory instructions causing each of the plurality of wireless station to:

receive the control message;

transmit a corresponding response message at a random access slot specified in the RA-TXOP;

receive an acknowledgement message identifying granting permission to transmit in an extended TXOP; and transmitting user data in the extended TXOP in accordance with the received acknowledgement message, wherein the control message further includes an acknowledgement policy parameter having a first value or a second value different from the first value, the first value indicating defering sending the acknowledgement message to an end of the random access slot and the second value indicating sending the acknowledgement message immediately after the response message.

28. The wireless communication network of claim 27, wherein the control message includes at least some of the following fields: a duration of random access transmission opportunity, a number random access slots of RA-TXOP, a duration of each random access slot, and minimum and maximum contention windows sizes used for random access.

* * * * *